(12) United States Patent
Iguchi

(10) Patent No.: US 11,710,870 B2
(45) Date of Patent: Jul. 25, 2023

(54) ELECTRICAL POWER CONTROL SYSTEM

(71) Applicant: HONDA MOTOR CO., LTD., Tokyo (JP)

(72) Inventor: Tsuyoshi Iguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/681,906

(22) Filed: Feb. 28, 2022

(65) Prior Publication Data
US 2022/0311076 A1 Sep. 29, 2022

(30) Foreign Application Priority Data
Mar. 26, 2021 (JP) ................... 2021-052610

(51) Int. Cl.
*H01M 8/04* (2016.01)
*H01M 16/00* (2006.01)
*H01M 8/04302* (2016.01)
*H01M 8/04858* (2016.01)

(52) U.S. Cl.
CPC ....... *H01M 16/006* (2013.01); *H01M 8/0488* (2013.01); *H01M 8/0494* (2013.01); *H01M 8/04302* (2016.02)

(58) Field of Classification Search
CPC ........... H01M 16/006; H01M 8/04302; H01M 8/0488; H01M 8/0494
See application file for complete search history.

(56) References Cited

U.S. PATENT DOCUMENTS

| 2007/0207356 A1* | 9/2007 | Miyata | H01M 8/04022 429/444 |
| 2012/0098507 A1* | 4/2012 | Hasegawa | H02M 1/32 323/271 |
| 2020/0067117 A1 | 2/2020 | Ito | |

FOREIGN PATENT DOCUMENTS

| JP | 2008-251448 A | 10/2008 |
| JP | 2016-091625 A | 5/2016 |
| JP | 2020-031030 A | 2/2020 |

* cited by examiner

*Primary Examiner* — Olatunji A Godo
(74) *Attorney, Agent, or Firm* — Carrier, Shende & Associates P.C.; Joseph P. Carrier; Jeffrey T. Gedeon

(57) ABSTRACT

An electrical power control system includes a first fuel cell system and a second fuel cell system, and a waste electricity unit connected in series with a switch unit. The waste electricity unit and the switch unit are connected in parallel with each of the fuel cell systems. At a time when at least one power supply system is started, a control unit selectively executes a charging control and a waste electricity control, based on at least one of temperature information and electrical storage information. The charging control suppresses a rise in voltage by supplying the electrical power of the power supply system to the power storage device. The waste electricity control suppresses a rise in voltage by supplying the electrical power of the power supply system to the waste electricity unit.

9 Claims, 11 Drawing Sheets

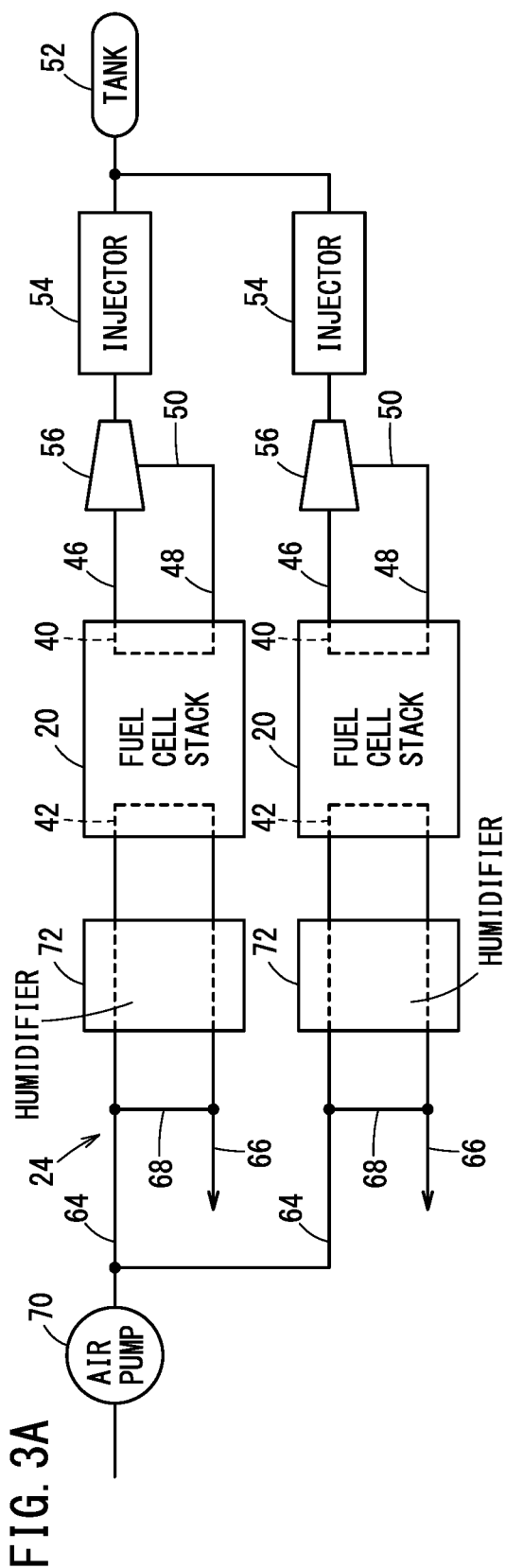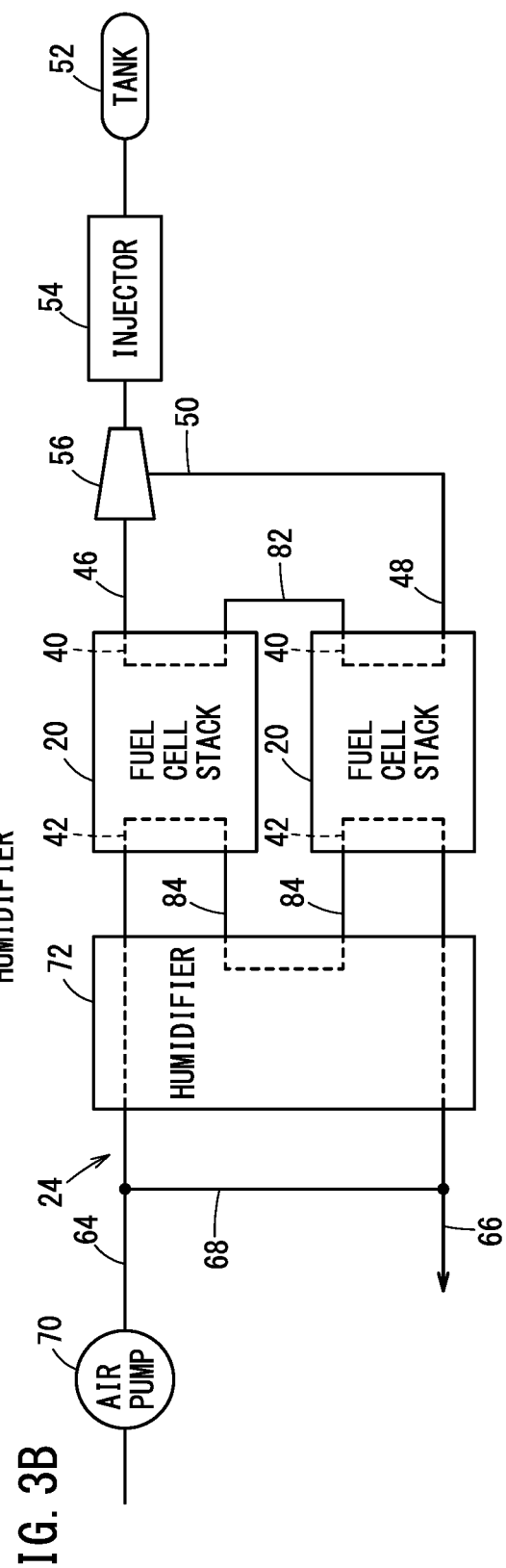

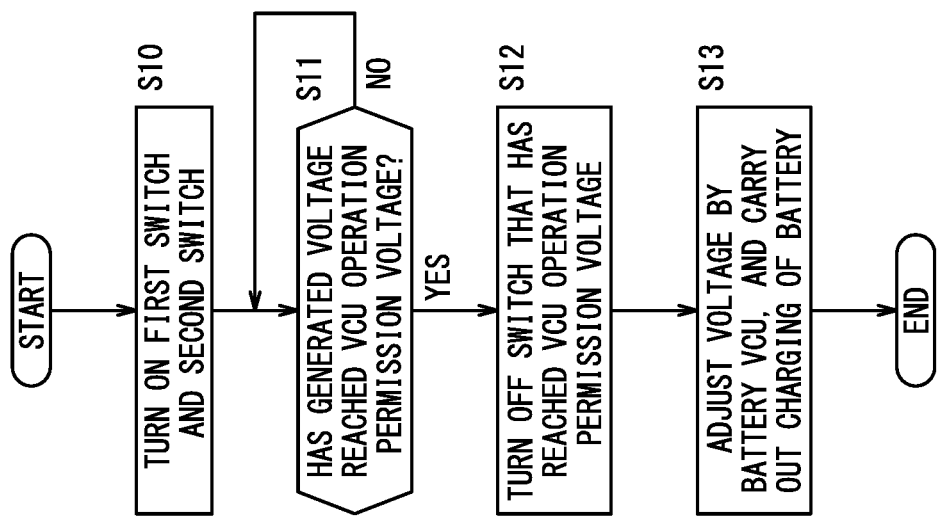
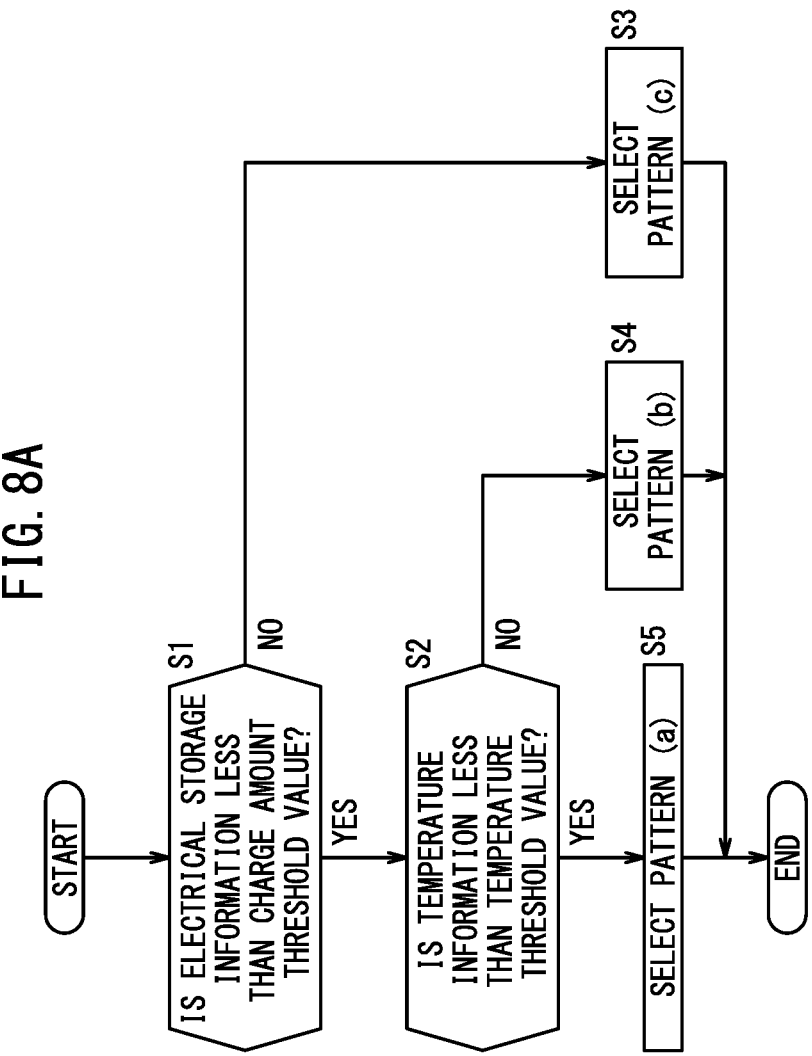

ELECTRICAL POWER CONTROL SYSTEM

CROSS-REFERENCE TO RELATED APPLICATIONS

This application is based upon and claims the benefit of priority from Japanese Patent Application No. 2021-052610 filed on Mar. 26, 2021, the contents of which are incorporated herein by reference.

BACKGROUND OF THE INVENTION

Field of the Invention

The present invention relates to an electrical power control system configured to control a voltage at a time when a fuel cell system is started.

Description of the Related Art

As disclosed in JP 2020-031030 A, an electrical power control system having a fuel cell system controls a generated voltage of a fuel cell stack by way of a VCU (voltage conversion unit), for example, a DC/DC converter.

SUMMARY OF THE INVENTION

Incidentally, in such a voltage control system, when the voltage is adjusted by the VCU which is provided in the fuel cell system, the output efficiency of the electrical power at the time of starting is lowered. In JP 2020-031030 A, an electrical power control system having a plurality of fuel cell systems (containing a fuel cell stack) is disclosed. In such an electrical power control system, in particular, since a VCU is provided in each of the fuel cell systems, the output efficiency is significantly reduced.

The present invention has the object of solving the aforementioned problem.

In order to realize such an object, an aspect of the present invention is characterized by an electrical power control system, comprising a fuel cell system, at least one power supply system equipped with a waste electricity unit connected in series with a switch unit, and further, connected in parallel with the fuel cell system together with the switch unit, a power storage device connected in parallel with the at least one power supply system, an electrical storage information acquisition unit configured to acquire electrical storage information related to a charge amount of the power storage device, a temperature information acquisition unit configured to acquire temperature information related to an ambient temperature of the at least one power supply system, and a control unit configured to control the at least one power supply system, wherein, at a time when the at least one power supply system is started, based on at least one of the temperature information and the electrical storage information, the control unit selectively executes a charging control in which a rise in voltage is suppressed by supplying electrical power of the at least one power supply system to the power storage device, and a waste electricity control in which a rise in voltage is suppressed by supplying the electrical power from the at least one power supply system to the waste electricity unit.

In the above-described power control system, by means of a simple configuration, by controlling the voltage when the fuel cell system is started, it is possible to enhance the output efficiency at the time of starting.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A and FIG. 3B are explanatory diagrams illustrating examples of a combination of a plurality of the unit fuel cell systems;

FIG. 8A is a flowchart showing a process flow at a time when activation is started;

FIG. 8B is a flowchart showing a process flow during the (a) pattern control;

DESCRIPTION OF THE INVENTION

Figure 1:
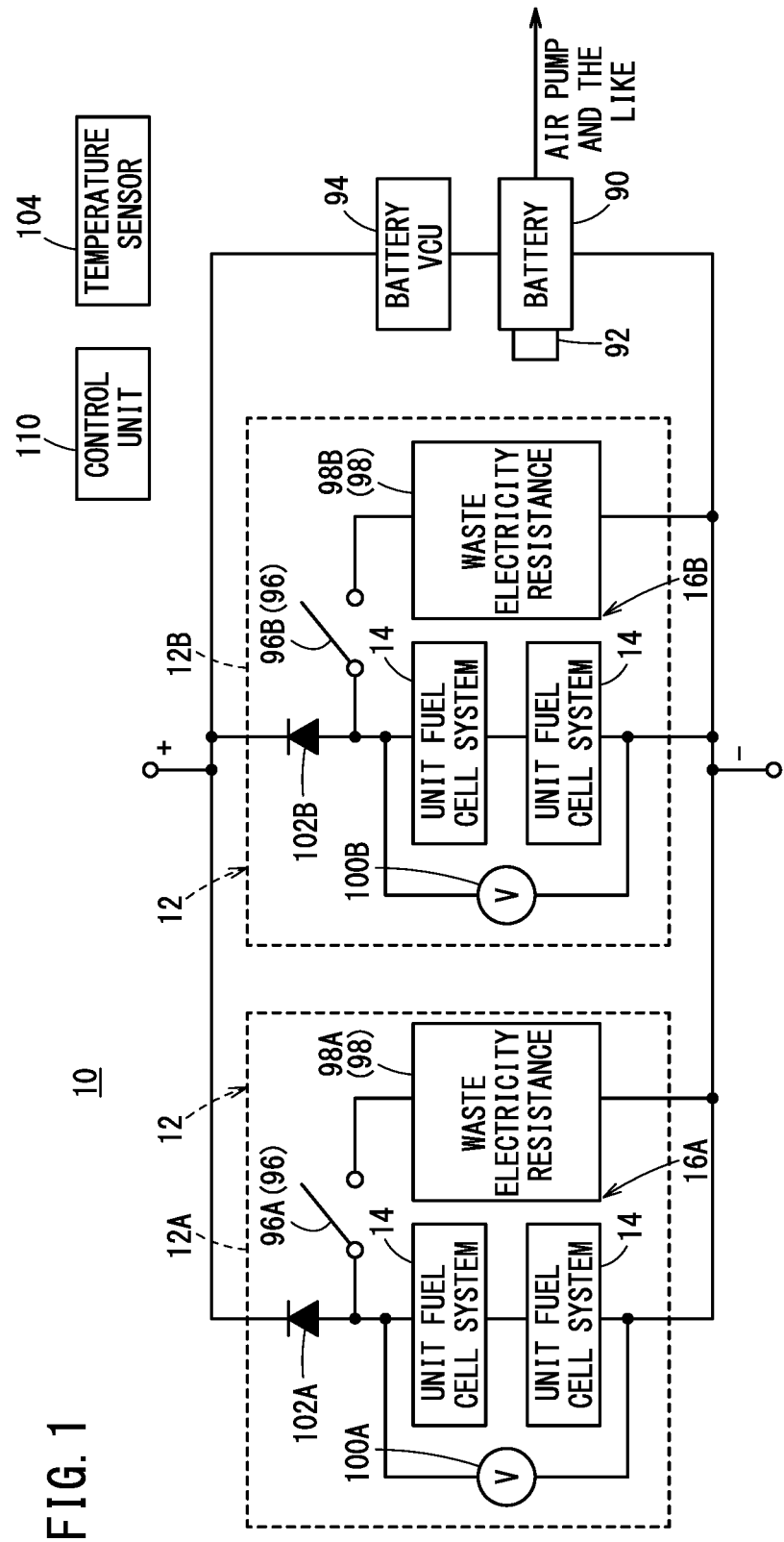
FIG. 1 is an explanatory diagram schematically showing an overall configuration of an electrical power control system according to an embodiment of the present invention.

As shown in FIG. 1, an electrical power control system 10 according to an embodiment of the present invention is equipped with a plurality of power supply systems 12 (two are shown in FIG. 1). The electrical power of the plurality of power supply systems 12 is capable of being controlled. At least one fuel cell system is provided in the interior of each of the power supply systems 12. Hereinafter, one of the fuel cell systems will be referred to as a unit fuel cell system 14. The unit fuel cell system 14 generates electrical power based on supplying of a fuel gas (hydrogen gas) and an oxygen containing gas (oxygen gas, air), and outputs the generated electrical power. This type of electrical power control system 10 is applied, for example, to a large scale movable body (a bus, a freight vehicle, a ship, an airplane, or the like) for which a high voltage and a high current are required. It should be noted that the target object to which the electrical power control system 10 is applied is not particularly limited. In the following description, among the two power supply systems 12 provided in the electrical power control system 10, one will be referred to as a first power supply system 12A, and the other will be referred to as a second power supply system 12B.

The first power supply system 12A and the second power supply system 12B are connected in parallel with each other.

In the present embodiment, each of the first power supply system 12A and the second power supply system 12B includes two unit fuel cell systems 14. Hereinafter, in the first power supply system 12A, a first fuel cell system 16A includes at least one of the unit fuel cell systems 14. In the second power supply system 12B, the second fuel cell system 16B includes at least one of the unit fuel cell systems 14.

As shown in FIG. 1, the first fuel cell system 16A and a second fuel cell system 16B include two of the unit fuel cell systems 14 connected in series. Each of the first fuel cell system 16A and the second fuel cell system 16B may include one of the unit fuel cell systems 14, or may include at least three of the unit fuel cell systems 14. In the case that the first fuel cell system 16A and the second fuel cell system 16B include a plurality of the unit fuel cell systems 14, the unit fuel cell systems 14 may be connected in parallel.

Figure 2:
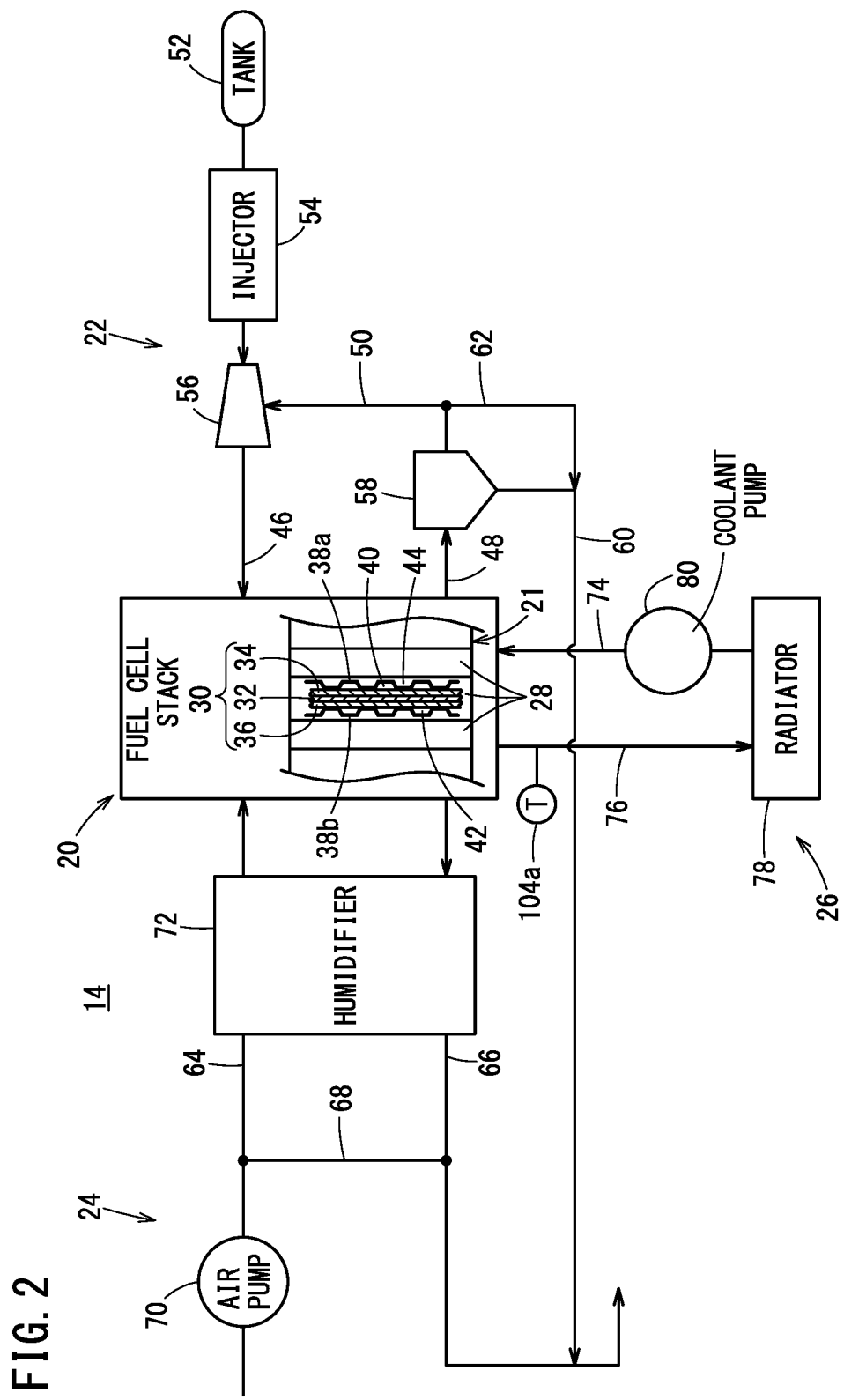
FIG. 2 is an explanatory diagram schematically showing the configuration of a unit fuel cell system.

As shown in FIG. 2, each of the unit fuel cell systems 14 includes a fuel cell stack 20, a fuel gas system device 22, an oxygen containing gas system device 24, and a cooling device 26. The fuel gas system device 22 causes the fuel gas to flow with respect to the fuel cell stack 20. The oxygen containing gas system device 24 causes the oxygen containing gas to flow with respect to the fuel cell stack 20. The cooling device 26 causes the coolant to flow with respect to the fuel cell stack 20.

The fuel cell stack 20 is equipped with a plurality of power generation cells 28. Each of the power generation cells 28 generates electrical power by electrochemical reactions that take place between a fuel gas and an oxygen containing gas. Each of the power generation cells 28 includes a membrane electrode assembly 30 and a pair of separators 38a and 38b that sandwich the membrane electrode assembly 30 therebetween. The membrane electrode assembly 30 includes an electrolyte membrane 32, an anode 34, and a cathode 36. The anode 34 is disposed on one surface of the electrolyte membrane 32, and the cathode 36 is disposed on another surface of the electrolyte membrane 32. A fuel gas flow field 40 through which the fuel gas flows is formed on a surface of the separator 38a facing toward the membrane electrode assembly 30. An oxygen containing gas flow field 42 through which the oxygen containing gas flows is formed on a surface of the separator 38b facing toward the membrane electrode assembly 30. Further, a plurality of the power generation cells 28 are stacked on each other, and a coolant flow field 44 through which the coolant flows is formed between surfaces of the separators 38a and 38b that face toward each other.

Furthermore, the fuel cell stack 20 is equipped with a non-illustrated plurality of passages (a fuel gas passage, an oxygen containing gas passage, and a coolant passage). The plurality of passages allow the fuel gas, the oxygen containing gas, and the coolant to flow in the stacking direction of the power generation cells 28. The fuel gas passage communicates with the fuel gas flow field 40. The oxygen containing gas passage communicates with the oxygen containing gas flow field 42. The coolant passage communicates with the coolant flow field 44.

The fuel gas flows from the fuel gas system device 22 into the fuel gas flow field 40 via the fuel gas passage on the inlet side of the fuel cell stack 20. The fuel gas is used for generating electrical power at the anode 34. A fuel off gas that has been used in the generation of electrical power flows out from the fuel gas flow field 40 into the fuel gas passage on the outlet side. In addition, the fuel off gas is discharged from the fuel cell stack 20 into the fuel gas system device 22. The fuel off gas contains unreacted hydrogen therein.

The oxygen containing gas flows from the oxygen containing gas system device 24 into the oxygen containing gas flow field 42 via the oxygen containing gas passage on the inlet side of the fuel cell stack 20. The oxygen containing gas is used for generating electrical power at the cathode 36. An oxygen containing off gas that has been used in the generation of electrical power flows out from the oxygen containing gas flow field 42 into the oxygen containing gas passage on the outlet side. In addition, the oxygen containing off gas is discharged from the fuel cell stack 20 into the oxygen containing gas system device 24.

The coolant flows from the cooling device 26 into the coolant flow field 44 via the coolant passage on the inlet side of the fuel cell stack 20. The coolant serves to cool each of the power generation cells 28. The coolant that has cooled each of the power generation cells 28 flows out from the coolant flow field 44 into the coolant passage on the outlet side, and is discharged from the fuel cell stack 20 into the cooling device.

Each of the power generation cells 28 of the fuel cell stack 20, which are configured in the manner described above, generates electrical power on the basis of supplying of the fuel gas and the oxygen containing gas. Non-illustrated terminal plates are disposed at both ends of the plurality of power generation cells 28 in the stacking direction. The generated electrical power of the fuel cell stack 20 is output from the terminal plates to the exterior of the fuel cell stack 20.

The fuel gas system device 22 includes a fuel gas supply path 46, a fuel gas discharge path 48, and a fuel gas circulation path 50. The fuel gas system device 22 forms a circulation circuit for returning into the fuel gas supply path 46 unreacted hydrogen that has been discharged into the fuel gas discharge path 48. The fuel gas supply path 46 includes a tank 52 in which high pressure fuel gas is stored at one end on an upstream end thereof. The fuel gas supply path 46 includes an injector 54 and an ejector 56 provided sequentially in this order from the tank 52 toward the fuel cell stack 20. The fuel gas discharge path 48 includes a gas-liquid separator 58 that separates liquid water and gas contained in the fuel off gas. A drain path 60 is connected to the gas-liquid separator 58. A purge path 62 is connected to the fuel gas circulation path 50.

The oxygen containing gas system device 24 includes an oxygen containing gas supply path 64, an oxygen containing gas discharge path 66, and an oxygen containing gas bypass path 68. The oxygen containing gas supply path 64 is provided with an air pump 70. The air pump 70 compresses the atmosphere (air) and supplies the compressed air to the fuel cell stack 20. The oxygen containing gas supply path 64 is equipped with a humidifier 72. The humidifier 72 humidifies the oxygen containing gas in the oxygen containing gas supply path 64, by water contained in an oxygen containing off gas of the oxygen containing gas discharge path 66. The drain path 60 (purge path 62) of the fuel gas system device 22 is connected to the oxygen containing gas discharge path 66.

The cooling device 26 has a coolant supply path 74 and a coolant discharge path 76. The coolant supply path 74 and the coolant discharge path 76 are connected to a radiator 78 that serves to cool the coolant. Further, a coolant pump 80 is provided in either one of the coolant supply path 74 and the coolant discharge path 76.

In the case that a plurality of the unit fuel cell systems 14 are provided, the first fuel cell system 16A and the second fuel cell system 16B can adopt various aspects. For example, the unit fuel cell systems 14 shown in FIG. 2 may be separately provided, or portions of the constituent equipment of the unit fuel cell systems 14 may be shared in common.

For example, as shown in FIG. 3A, the first fuel cell system 16A and the second fuel cell system 16B may share in common the tank 52 of the fuel gas system device 22 and the air pump 70 of the oxygen containing gas system device 24. In accordance with this feature, a plurality of the fuel cell stacks 20 can be connected in parallel by appropriately setting the paths of each of the devices. In essence, the first fuel cell system 16A and the second fuel cell system 16B include a plurality of the unit fuel cell systems 14. The plurality of the unit fuel cell systems 14 may be equipped with a plurality of the fuel cell stacks 20. Concerning the other configurations for causing the fuel gas, the oxygen containing gas, and the coolant to flow, the configurations thereof are not particularly limited.

Alternatively, as shown in FIG. 3B, the first fuel cell system 16A and the second fuel cell system 16B may include a plurality of the fuel cell stacks 20 connected in series. More specifically, in the first fuel cell system 16A and the second fuel cell system 16B, the fuel gas supply path 46 is connected to one of the fuel cell stacks 20, and the fuel gas discharge path 48 is connected to the other one of the fuel cell stacks 20. Additionally, a fuel gas outlet of one of the fuel cell stacks 20 and a fuel gas inlet of the other one of the fuel cell stacks 20 are connected by a fuel gas relay path 82. Similarly, the oxygen containing gas supply path 64 is connected to one of the fuel cell stacks 20, and the oxygen containing gas discharge path 66 is connected to the other one of the fuel cell stacks 20. Additionally, an oxygen containing gas outlet of one of the fuel cell stacks 20 and an oxygen containing gas inlet of the other one of the fuel cell stacks 20 are connected by an oxygen containing gas relay path 84.

Returning to FIG. 1, the electrical power control system 10 includes a battery 90 (power storage device) connected in parallel with the first power supply system 12A and the second power supply system 12B. The first power supply system 12A includes the first fuel cell system 16A, and the second power supply system 12B includes the second fuel cell system 16B. For the battery 90, there is applied a battery having a high capacity which is capable of storing the electrical power of the plurality of power supply systems 12. Further, as shown in FIG. 1, the electrical power control system 10 is configured to be equipped with one battery 90. However, the electrical power control system 10 may be equipped with a plurality of batteries 90.

The battery 90 comprises a charge amount detection unit 92. The charge amount detection unit 92 acquires the charge amount (charge state: SOC) of the battery 90. As a method for detecting the charge amount of the battery 90, a well-known method can be adopted. The charge amount detection unit 92 may be appropriately configured in accordance with the method adopted therefor. For example, the charge amount detection unit 92 includes a processing circuit and a storage unit. The processing circuit contains a processor such as a CPU or the like. The storage unit includes a volatile memory such as a RAM, and a non-volatile memory such as a ROM, a flash memory, or the like. The storage unit stores programs and the like. By the processing circuit executing such programs, the charge amount detection unit 92 acquires the charge amount of the battery 90. The charge detection process of the battery 90 by the charge amount detection unit 92 may be realized by an electronic circuit including an ASIC, an FPGA, or another type of integrated circuit.

Further, the electrical power control system 10 includes a voltage adjusting device (hereinafter referred to as a battery VCU 94) connected in series with the battery 90. The battery VCU 94 is connected in parallel with the first power supply system 12A and the second power supply system 12B. The battery VCU 94 includes a DC/DC converter (voltage step-up/step-down converter), a contactor, and the like. The contactor connects and disconnects a power supply path. The battery VCU 94, under the control of a later-described control unit 110, steps-down the generated voltage supplied from the first power supply system 12A and the second power supply system 12B, and steps-up or boosts the output voltage from the battery 90.

The first power supply system 12A includes a waste electricity unit 98 connected in series with a switch unit 96 (hereinafter referred to as a first switch 96A). The waste electricity unit 98 and the first switch 96A are connected in parallel with the first fuel cell system 16A. The waste electricity unit 98 includes a waste electricity resistance (hereinafter, referred to as a first waste electricity resistance 98A) having an appropriate resistance value. Further, the first power supply system 12A includes a first voltmeter 100A that detects the output voltage of the first fuel cell system 16A. Furthermore, the first power supply system 12A includes a first diode 102A provided in a power output wiring of the first power supply system 12A. The first diode 102A blocks the electrical power directed from the battery 90 or the second power supply system 12B toward the first power supply system 12A.

The second power supply system 12B includes the waste electricity unit 98 connected in series with the switch unit 96 (hereinafter referred to as a second switch 96B). The waste electricity unit 98 and the second switch 96B are connected in parallel with the second fuel cell system 16B. The waste electricity unit 98 includes a waste electricity resistance (hereinafter, referred to as a second waste electricity resistance 98B) having an appropriate resistance value. Further, the second power supply system 12B includes a second voltmeter 100B that detects the output voltage of the second fuel cell system 16B. Furthermore, the second power supply system 12B includes a second diode 102B provided in a power output wiring of the second power supply system 12B. The second diode 102B blocks the electrical power directed from the battery 90 or the first power supply system 12A toward the second power supply system 12B.

As the first waste electricity resistance 98A and the second waste electricity resistance 98B, there may be applied a heater (not shown) provided in order to raise the temperature in the movable body. As examples of such a heater, there may be cited a heater that raises the temperature of the battery 90, a heater that raises the temperature of the respective constituent equipment of the unit fuel cell systems 14, a seat heater of the movable body, and the like. A resistance value of the first waste electricity resistance 98A and a resistance value of the second waste electricity resistance 98B may be the same as or different from each other.

Furthermore, the electrical power control system 10 is equipped with a temperature sensor 104 that acquires temperature information related to the ambient temperature of the movable body (the power supply systems 12), and a control unit 110. The control unit 110 receives and processes the temperature information from the temperature sensor 104 and the electrical storage information (the charge amount of the battery 90) from the charge amount detection unit 92. For the temperature sensor 104, there can be applied, for example, an outside air temperature sensor (not shown), a coolant outlet temperature sensor 104a (refer to FIG. 2), or the like. The outside air temperature sensor detects the outside air temperature of the movable body. The coolant outlet temperature sensor 104a is provided in the coolant discharge path 76 of the unit fuel cell systems 14. The temperature sensor 104 is not particularly limited insofar as it is capable of acquiring the temperature information of the power supply systems.

The control unit 110 includes a processing circuit including at least one processor, a memory, an input/output interface, an electronic circuit, and a communication module (none of which are shown). A plurality of functional blocks for controlling operations of the electrical power control system 10 are formed in the control unit 110. Operations of the electrical power control system 10 are controlled by the at least one processor executing non-illustrated programs stored in the memory. Moreover, at least a portion of each of the functional blocks may be constituted by an integrated circuit such as an ASIC (Application Specific Integrated Circuit), an FPGA (Field Programmable Gate Array), and an electronic circuit containing a discrete device. Concerning the memory, there can be applied thereto various drives (HDD, SSD, etc.), or alternatively, the memory may include a memory that is attached to a processor, an integrated circuit, or the like.

Figure 4:
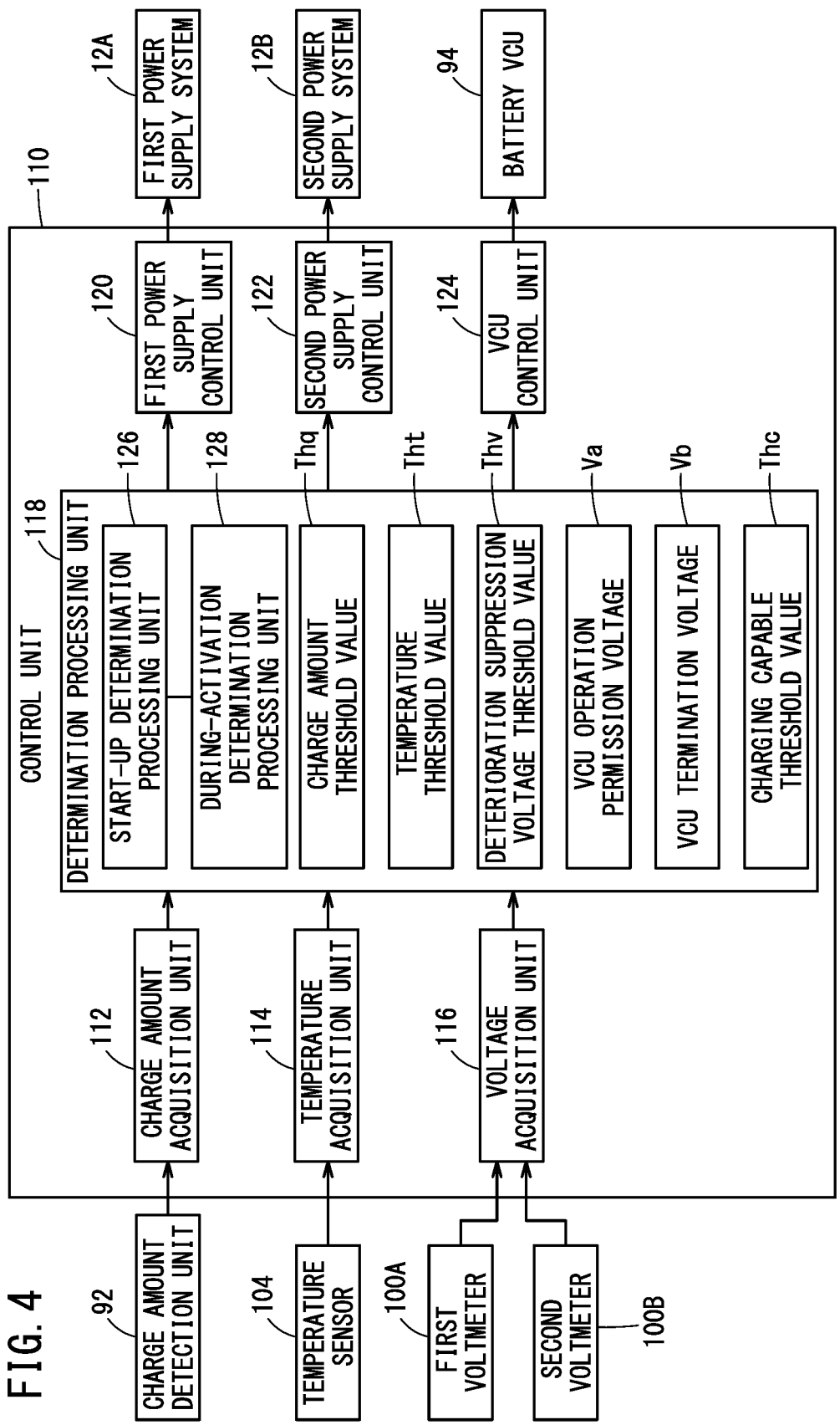
FIG. 4 is a block diagram in which functional blocks of a control unit are illustrated.

The control unit 110 controls operations of the first power supply system 12A, the second power supply system 12B, and the battery VCU 94. The control unit 110 may also serve in a dual manner as a control unit (not shown) for the unit fuel cell systems 14. The control unit for the unit fuel cell systems 14 controls operations of the respective configurations of the first fuel cell system 16A and the second fuel cell system 16B. Further, the control unit 110 appropriately controls rising voltages of the first power supply system 12A and the second power supply system 12B at the time when the first power supply system 12A and the second power supply system 12B are started. As a result, it is possible to improve the output efficiency of each of the power supply systems 12. More specifically, as shown in FIG. 4, the control unit 110 includes a charge amount acquisition unit 112, a temperature acquisition unit 114, a voltage acquisition unit 116, a determination processing unit 118, a first power supply control unit 120, a second power supply control unit 122, and a VCU control unit 124.

The charge amount acquisition unit 112 acquires the electrical storage information from the charge amount detection unit 92 at an appropriate timing, and stores the electrical storage information in the memory. The charge amount acquisition unit 112 outputs the electrical storage information to the determination processing unit 118. The temperature acquisition unit 114 acquires the temperature information from the temperature sensor 104 at an appropriate timing, and stores the temperature information in the memory. The temperature acquisition unit 114 outputs the temperature information to the determination processing unit 118. The voltage acquisition unit 116 acquires at an appropriate timing the first voltage information detected by the first voltmeter 100A and the second voltage information detected by the second voltmeter 100B, and stores the first voltage information and the second voltage information in the memory. The voltage acquisition unit 116 outputs each of the respective voltage information to the determination processing unit 118.

The determination processing unit 118 determines the control content of the electrical power control system 10 on the basis of the temperature information, the electrical storage information, the first voltage information, and the second voltage information. Determination of the control content of the electrical power control system 10 is executed at times when activation of the respective power supply systems 12 is started, and during activation of each of the power supply systems 12. For this purpose, the determination processing unit 118 includes a start-up determination processing unit 126 that operates when activation is started, and a during activation determination processing unit 128 that operates during activation, i.e., after completion of the time when activation is started. Further, the determination processing unit 118 includes a temperature threshold value Tht (a predetermined temperature) for comparison with the temperature information, and a charge amount threshold value Thq (a predetermined charge amount) for comparison with the electrical storage information. Furthermore, the determination processing unit 118 includes a deterioration suppression voltage threshold value Thy, a VCU operation permission voltage Va, a VCU termination voltage Vb, and a charging capable threshold value Thc for comparison with the first voltage information and the second voltage information. The VCU operation permission voltage Va and the VCU termination voltage Vb are values that are lower than the deterioration suppression voltage threshold value Thy, and serve to regulate an operable voltage range (hysteresis width) of the battery VCU 94.

In this instance, the electrical power control system 10 according to the present embodiment selectively executes a charging control and a waste electricity control. The charging control suppresses a rise in voltage by supplying the electrical power of the respective power supply systems 12 to the battery 90. The waste electricity control suppresses a rise in voltage by supplying the electrical power of the respective power supply systems 12 to the waste electricity unit 98. The charging control and the waste electricity control are performed by each of the first power supply system 12A and the second power supply system 12B, respectively. Therefore, the first power supply control unit 120 performs the charging control and the waste electricity control of the first power supply system 12A, in accordance with commands from the determination processing unit 118 (the start-up determination processing unit 126 and the during activation determination processing unit 128). Similarly, the second power supply control unit 122 performs the charging control and the waste electricity control of the second power supply system 12B, in accordance with commands from the determination processing unit 118 (the start-up determination processing unit 126 and the during activation determination processing unit 128). Further, the VCU control unit 124 controls operations of the battery VCU 94, in accordance with commands from the during activation determination processing unit 128.

At the time when activation of each of the power supply systems 12 is started, as shown in the following patterns (a) to (d), the start-up determination processing unit 126 sets appropriate control processes, based on a comparison result between the temperature information and the temperature threshold value Tht, and a comparison result between the electrical storage information and the charge amount threshold value Thq.

(a) temperature information<temperature threshold value Tht and electrical storage information<charge amount threshold value Thq The waste electricity control is executed first, and thereafter, the charging control is executed.

(b) temperature information≥temperature threshold value Tht and electrical storage information<charge amount threshold value Thq Only the charging control is executed.

(c) temperature information<temperature threshold value Tht and electrical storage information≥charge amount threshold value Thq The waste electricity control and discharging of the battery 90 are executed first, and thereafter, the charging control is executed.

(d) temperature information≥temperature threshold value Tht and electrical storage information≥charge amount threshold value Thq Only the waste electricity control is executed. However, in the case that the charge amount of the battery 90 has decreased, a transition is made to the charging control.

On the other hand, in the case that the waste electricity control is performed in the above-described patterns (a) and (c), in order to determine transitioning from the waste electricity control to the charging control, the during activation determination processing unit 128, in addition to the temperature information and the electrical storage information, uses the first voltage information and the second voltage information. Hereinafter, the controls that take place in each of the patterns will be specifically described.

The pattern (a) is a starting method for a case in which, at the time when activation of the first power supply system 12A and the second power supply system 12B is started, the electrical power control system 10 is in a state of being in a low temperature environment, and further, there is room in the battery 90 that is capable of being charged. When the start-up determination processing unit 126 determines that the temperature information is less than the temperature threshold value Tht, and further, that the electrical storage information is less than the charge amount threshold value Thq, the start-up determination processing unit 126 initiates execution of the process according to the pattern (a).

Figure 5:
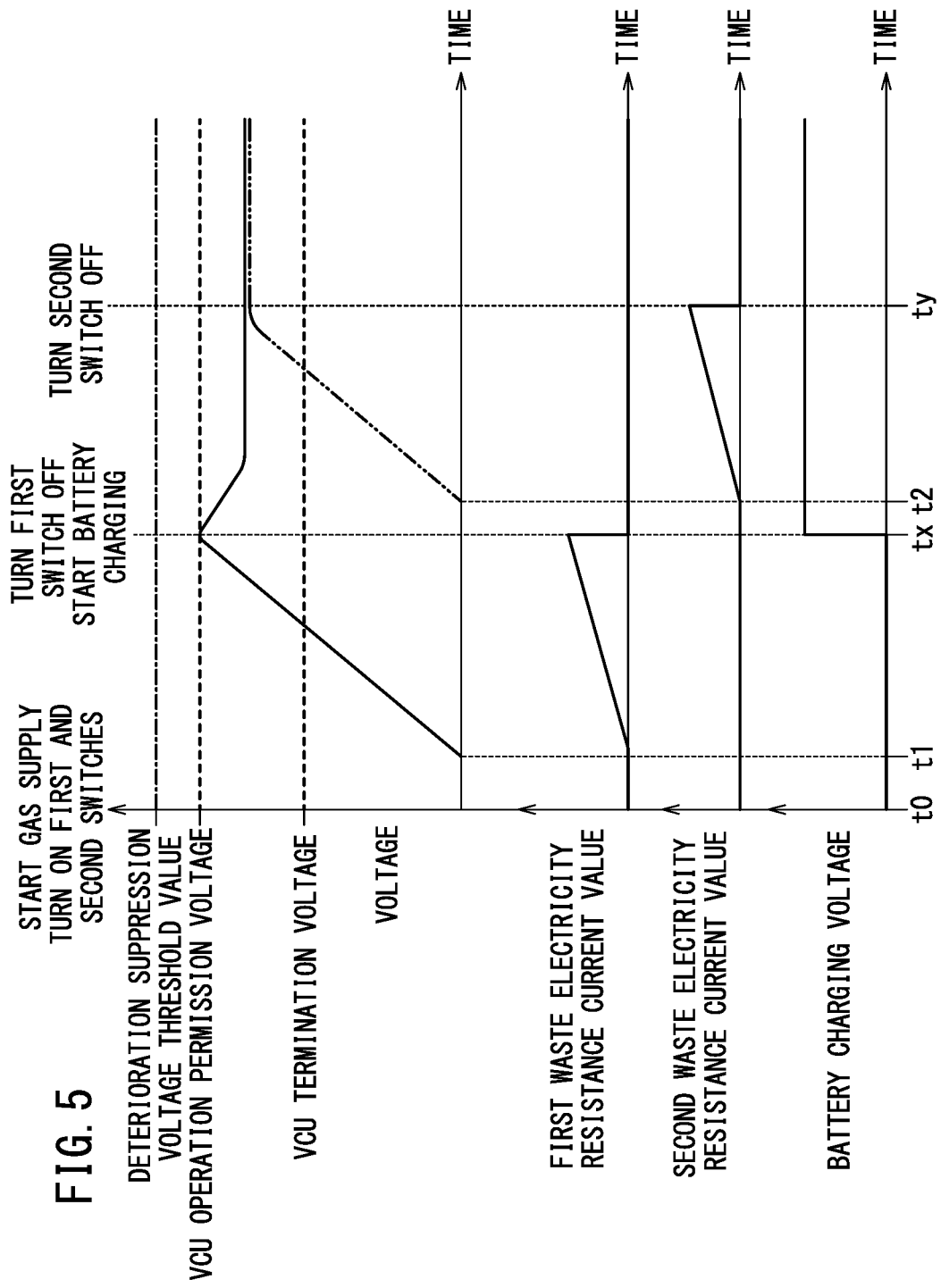
FIG. 5 is a graph showing an (a) pattern control of the electrical power control system.

In this case, as shown in FIG. 5, the start-up determination processing unit 126 outputs a waste electricity control command to the first power supply control unit 120 and the second power supply control unit 122. Consequently, at a starting time point t0, the first power supply control unit 120 turns on the first switch 96A of the first power supply system 12A. At the starting time point t0, the second power supply control unit 122 turns on the second switch 96B of the second power supply system 12B. As a result, the generated electrical power of the first fuel cell system 16A can be supplied to the first waste electricity resistance 98A. Further, the generated electrical power of the second fuel cell system 16B can be supplied to the second waste electricity resistance 98B.

Further, the first fuel cell system 16A and the second fuel cell system 16B each initiate activation at the starting time point t0 under the control of the control unit 110 used by the fuel cells. However, since each of the fuel cell stacks 20 generates electrical power on the basis of supplying of the fuel gas and the oxygen containing gas, there is a time lag in outputting of the generated electrical power. Further, in the first fuel cell system 16A and the second fuel cell system 16B, due to being affected by an influence of freezing of auxiliary equipment or layout of the piping, etc., cases may occur in which there is a gap between supplying of the fuel gas and supplying of the oxygen containing gas with respect to each of the fuel cell stacks 20. For example, in FIG. 5, an example is shown in which generation of electrical power by the first fuel cell system 16A and generation of electrical power by the second fuel cell system 16B are started. In the first fuel cell system 16A, generation of electrical power is started at a time point t1. In the second fuel cell system 16B, generation of electrical power is started at a time point t2 which is later than the time point t1.

Therefore, the generated voltage of the first fuel cell system 16A gradually increases from the time point t1. Further, along therewith, a current value of the first waste electricity resistance 98A rises. By the generated electrical power being directed toward the first waste electricity resistance 98A, in each of the fuel cell stacks 20 of the first fuel cell system, the generation of electrical power positively progresses, and warming-up is promoted.

Further, the during activation determination processing unit 128, which has been operated after starting, monitors the first voltage information. In addition, the during activation determination processing unit 128 determines whether or not the generated voltage of the first fuel cell system 16A has reached the VCU operation permission voltage Va. Moreover, in the case that the generated voltage of the second fuel cell system 16B rises first, based on the second voltage information, the during activation determination processing unit 128 determines whether or not the generated voltage of the second fuel cell system 16B has reached the VCU operation permission voltage Va. In the case that the generated voltage of the first fuel cell system 16A is less than the VCU operation permission voltage Va, the during activation determination processing unit 128 continues the waste electricity control by the first power supply system 12A.

The during activation determination processing unit 128 outputs a charging control command to the first power supply system 12A and the VCU control unit 124, at a time point tx when the generated voltage of the first fuel cell system 16A becomes greater than or equal to the VCU operation permission voltage Va. Consequently, the first power supply control unit 120 turns off the first switch 96A, and by the VCU control unit 124 causing the battery VCU 94 to operate, switching is carried out to a voltage control performed by the battery VCU 94. As a result, the generated electrical power of the first fuel cell system 16A is used for charging the battery 90, while a rise in voltage is suppressed in a manner so that, by operation of the battery VCU 94, the voltage becomes less than the deterioration suppression voltage threshold value Thy.

Concerning the second power supply system 12B as well, which has initiated the generation of electrical power at the time point t2, the during activation determination processing unit 128 monitors the second voltage information while executing the waste electricity control. The generated voltage of the second fuel cell system 16B gradually rises, and in accordance therewith, the current value of the second waste electricity resistance 98B rises. However, since the battery VCU 94 is being operated, the generated voltage of the second power supply system 12B rises until reaching the same value as the generated voltage of the first power supply system 12A, and a further rise in the generated voltage is suppressed. The during activation determination processing unit 128 turns off the second switch 96B at a time point ty when the generated voltage of the second power supply system 12B has reached the generated voltage of the first power supply system 12A. Consequently, both the generated electrical power of the second fuel cell system 16B and the generated electrical power of the first fuel cell system 16A are supplied to the battery 90, and charging of the battery 90 is carried out.

Next, the pattern (b) is a starting method for a case in which, at the time when activation of the first power supply system 12A and the second power supply system 12B is started, the electrical power control system 10 is in a normal temperature environment, and further, there is room in the battery 90 that is capable of being charged. When the start-up determination processing unit 126 determines that the temperature information is greater than or equal to the temperature threshold value Tht, and further, that the electrical storage information is less than the charge amount threshold value Thq, the start-up determination processing unit 126 initiates execution of the process according to the pattern (b).

Figure 6:
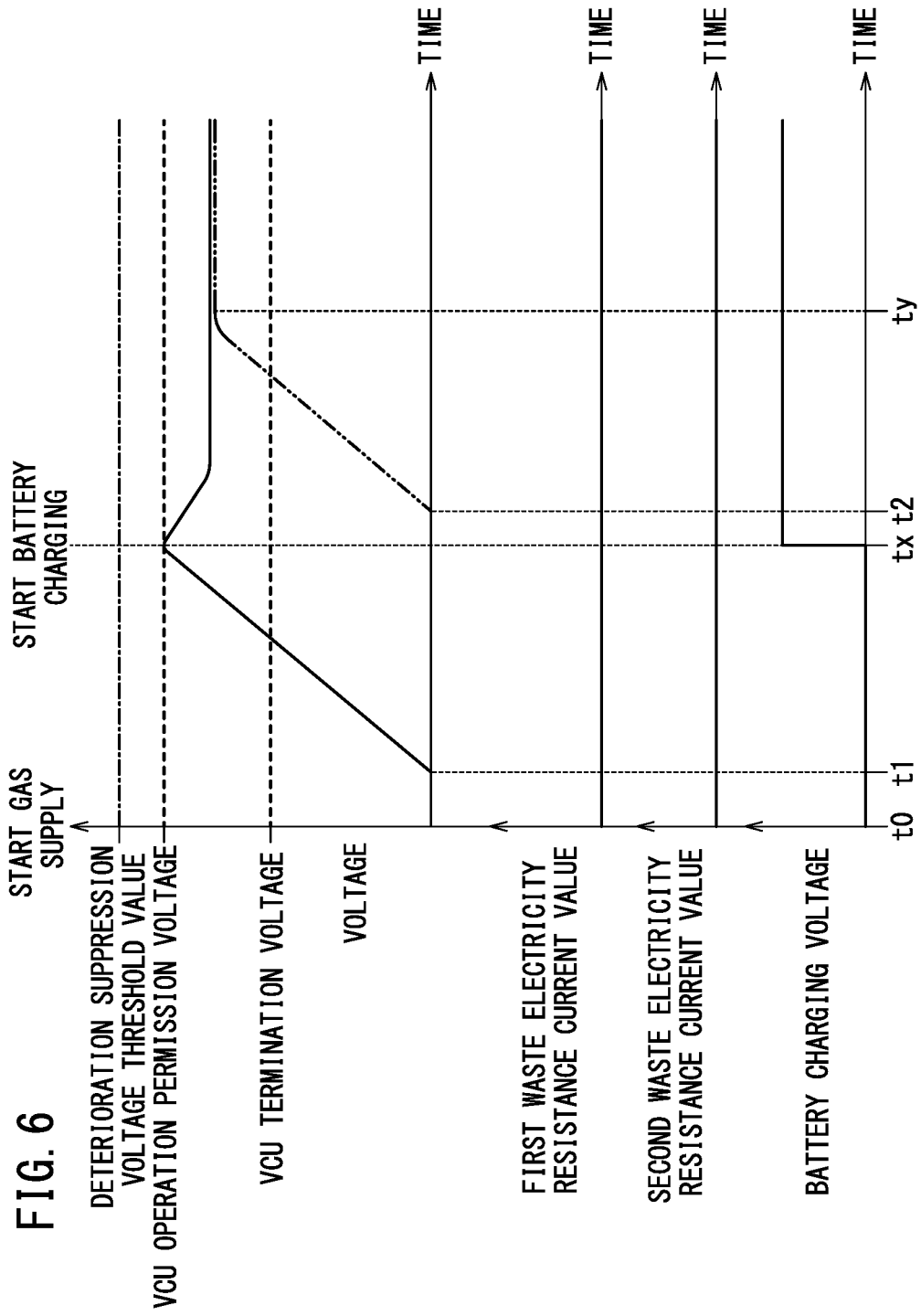
FIG. 6 is a graph showing a (b) pattern control of the electrical power control system.

In this case, as shown in FIG. 6, the start-up determination processing unit 126 outputs the charging control command to the first power supply control unit 120 and the second power supply control unit 122. Consequently, at the starting time point t0, the first power supply control unit 120 turns off the first switch 96A of the first power supply system 12A. Further, at the starting time point t0, the second power supply control unit 122 turns off the second switch 96B of the second power supply system 12B. As a result, both the generated electrical power of the first fuel cell system 16A and the generated electrical power of the second fuel cell system 16B are placed in a state in which supplying thereof to the battery 90 is possible.

Further, the first fuel cell system 16A and the second fuel cell system 16B each initiate activation at the starting time point t0 under the control of the control unit 110 used by the fuel cells. Therefore, the generated voltage of the first fuel cell system 16A gradually increases from the time point t1.

Further, the during activation determination processing unit 128, which is operated after starting, monitors the first voltage information, and determines whether or not the generated voltage of the first fuel cell system 16A has reached the VCU operation permission voltage Va. In the case that the generated voltage of the first fuel cell system 16A has reached the VCU operation permission voltage Va, the battery VCU 94 is made to operate under the control of the VCU control unit 124, and the during activation determination processing unit 128 carries out the voltage control by the battery VCU 94. Consequently, the generated electrical power of the first fuel cell system 16A is used for charging the battery 90, while a rise in voltage is suppressed in a manner so that, by operation of the battery VCU 94, the voltage becomes less than the deterioration suppression voltage threshold value Thy.

Concerning the second power supply system 12B as well, which has initiated the generation of electrical power at the time point t2, the during activation determination processing unit 128 monitors the second voltage information. Since the battery VCU 94 is being operated, the generated voltage of the second power supply system 12B rises until reaching the same value as the generated voltage of the first power supply system 12A, and a further rise in the generated voltage is suppressed. More specifically, the generated electrical power of the second fuel cell system 16B, and the generated electrical power of the first fuel cell system 16A are used for charging the battery 90, while a rise in voltage is suppressed in a manner so that the voltage becomes less than the deterioration suppression voltage threshold value Thy.

Next, the pattern (c) is a starting method for a case in which, at the time when activation of the first power supply system 12A and the second power supply system 12B is started, the electrical power control system 10 is in a low temperature environment, and further, the charge amount of the battery 90 is sufficient. When the start-up determination processing unit 126 determines that the temperature information is less than the temperature threshold value Tht, and further, that the electrical storage information is greater than or equal to the charge amount threshold value Thq, the start-up determination processing unit 126 initiates execution of the process according to the pattern (c).

Figure 7:
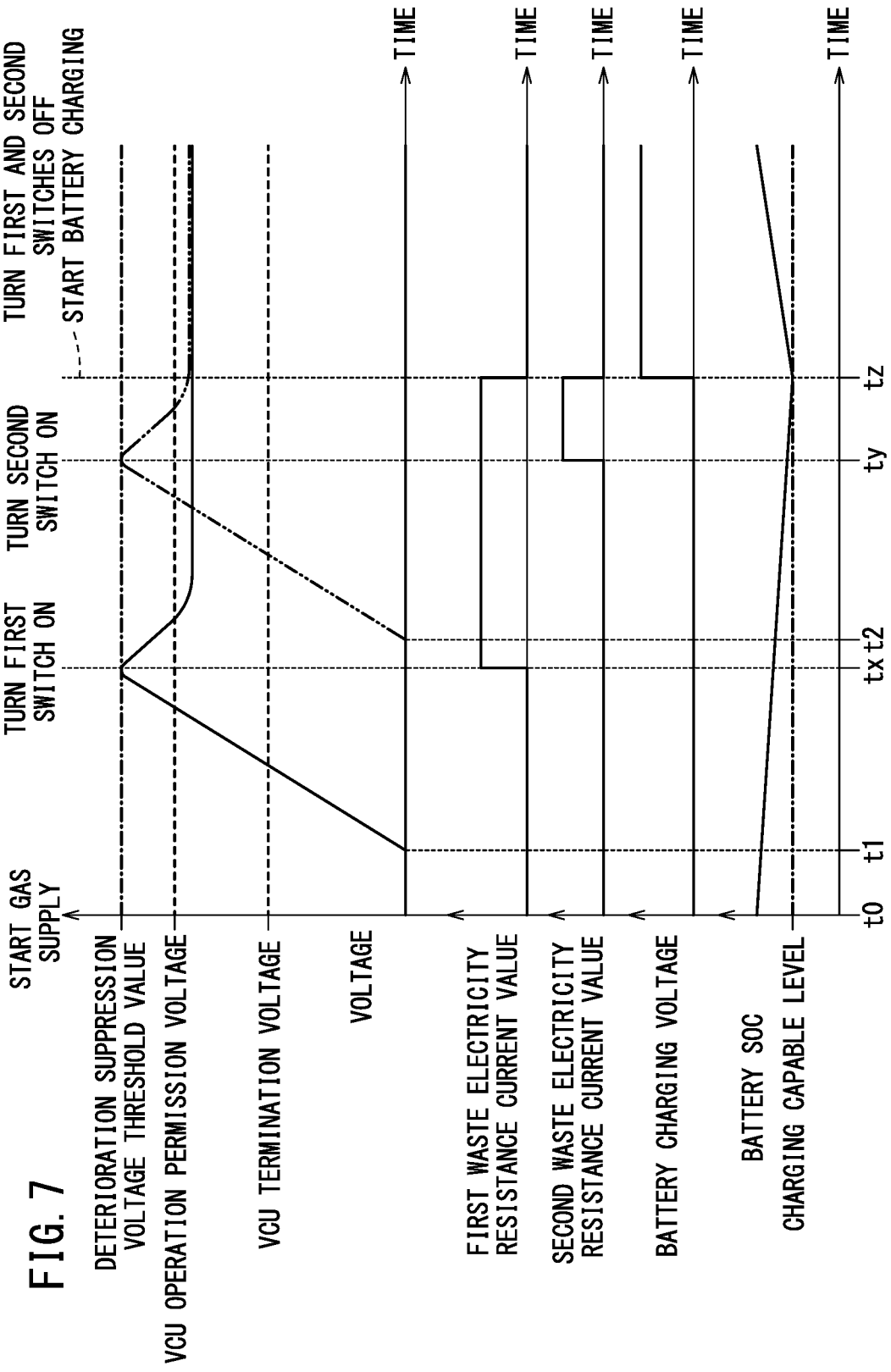
FIG. 7 is a graph showing a (c) pattern control of the electrical power control system.

In this case, as shown in FIG. 7, the start-up determination processing unit 126 outputs the waste electricity control command to the first power supply control unit 120 and the second power supply control unit 122. However, outputting of the waste electricity control command to the first power supply control unit 120 takes place at a timing at which the generated electrical power of the first fuel cell system 16A has reached the deterioration suppression voltage threshold value Thy. Similarly, outputting of the waste electricity control command to the second power supply control unit 122 takes place at a timing at which the generated electrical power of the second fuel cell system 16B has reached the deterioration suppression voltage threshold value Thy. Consequently, at the starting time point t0, the first power supply control unit 120 turns off the first switch 96A of the first power supply system 12A, and the second power supply control unit 122 turns off the second switch 96B of the second power supply system 12B.

Further, the battery 90 carries out discharging to auxiliary equipment such as an air pump 70 (or a heater, an air conditioner, or the like) of the unit fuel cell systems 14. Therefore, the charge amount of the battery 90 gradually decreases from the starting time point to.

Therefore, the generated voltage of the first fuel cell system 16A gradually increases from the time point t1. The during activation determination processing unit 128, which is operated after starting, monitors the first voltage information, and determines whether or not the generated voltage of the first fuel cell system 16A has reached the deterioration suppression voltage threshold value Thy. At the time point tx when the generated voltage of the first fuel cell system 16A becomes the deterioration suppression voltage threshold value Thy, the during activation determination processing unit 128 outputs the waste electricity control command to the first power supply system 12A. Consequently, the first power supply control unit 120 turns on the first switch 96A, and thereby guides the generated electrical power of the first fuel cell system 16A to the first waste electricity resistance 98A. As a result, the generated voltage of the first fuel cell system 16A is lowered (a rise in voltage is suppressed), and becomes less than or equal to the VCU operation permission voltage Va.

Further, the generated voltage of the second fuel cell system 16B gradually increases from the time point t2. The during activation determination processing unit 128 monitors the second voltage information, and determines whether or not the generated voltage of the second fuel cell system 16B has reached the deterioration suppression voltage threshold value Thy. At the time point ty when the generated voltage of the second fuel cell system 16B becomes the deterioration suppression voltage threshold value Thy, the during activation determination processing unit 128 outputs the waste electricity control command to the second power supply system 12B. Consequently, the second power supply control unit 122 turns on the second switch 96B, and thereby guides the generated electrical power of the second fuel cell system 16B to the second waste electricity resistance 98B. As a result, the generated voltage of the second fuel cell system 16B is lowered (a rise in voltage is suppressed), and becomes less than or equal to the VCU operation permission voltage Va.

In addition, during activation, the during activation determination processing unit 128 determines whether or not, due to discharging of the battery 90, the charge amount (the electrical storage information) has become less than the charging capable threshold value Thc. In the case that the electrical storage information is greater than or equal to the charging capable threshold value Thc, the during activation determination processing unit 128 continues the waste electricity control of the first power supply system 12A and the second power supply system 12B. On the other hand, in the case that the electrical storage information is less than the charging capable threshold value Thc, the during activation determination processing unit 128 outputs the charging control command to the first power supply control unit 120, the second power supply control unit 122, and the VCU control unit 124. Consequently, the first power supply control unit 120 turns off the first switch 96A, the second power supply control unit 122 turns off the second switch 96B, and the VCU control unit 124 initiates operation of the battery VCU 94. In accordance therewith, the generated electrical power of the first fuel cell system 16A and the second fuel cell system 16B is used for charging the battery 90, while a rise in voltage is suppressed by operation of the battery VCU 94.

Further, in the pattern (d), basically, due to the waste electricity control of the first power supply system 12A and the waste electricity control of the second power supply system 12B being performed, charging of the battery 90 is not carried out. On the other hand, at the time when the first fuel cell system 16A and the second fuel cell system 16B are in operation, due to the battery 90 supplying the electrical power to the auxiliary equipment, the charge amount is reduced. Therefore, in the case that the electrical storage information of the battery 90 becomes less than the charging capable threshold value Thc, the first power supply system 12A, the second power supply system 12B, and the VCU control unit 124 transition from the waste electricity control to the charging control. Accordingly, a situation is brought about in which a control that is roughly the same as that of the pattern (c) is performed.

The electrical power control system 10 according to the present embodiment is basically configured in the manner described above. Hereinafter, a description will be given concerning operations (a process flow) thereof.

As described above, the control unit 110 of the electrical power control system 10 executes the waste electricity control and the charging control for each of the first power supply system 12A and the second power supply system 12B. More specifically, as shown in FIG. 8A, at the time of starting activation of the first power supply system 12A and the second power supply system 12B, the start-up determination processing unit 126 compares the electrical storage information with the charge amount threshold value Thq, and determines whether or not the electrical storage information is less than the charge amount threshold value Thq (step S1). In the case that the electrical storage information is greater than or equal to the charge amount threshold value Thq (step S1: NO), the aforementioned pattern (c) or the pattern (d) is selected (step S3). However, as described previously, the pattern (c) and the pattern (d) are roughly the same, and substantially, the pattern (c) is executed irrespective of the temperature information.

On the other hand, in the case that the electrical storage information is less than the charge amount threshold value Thq (step S1: YES), the process proceeds to step S2, and the start-up determination processing unit 126 compares the temperature information with the temperature threshold value Tht. In addition, a determination is made as to whether or not the temperature information is less than the temperature threshold value Tht (step S2). In the case that the temperature information is greater than or equal to the temperature threshold value Tht (step S2: NO), the start-up determination processing unit 126 selects the pattern (b) (step S4). On the other hand, in the case that the temperature information is less than the temperature threshold value Tht (step S2: YES), the start-up determination processing unit 126 selects the pattern (a) (step S5).

In the pattern (a), the during activation determination processing unit 128 executes the waste electricity control of the first power supply system 12A and the second power supply system 12B in the manner described above. In this case, as shown in FIG. 8B, the unit fuel cell systems 14 start supplying the fuel gas and the oxygen containing gas. Further, the during activation determination processing unit 128 turns on the first switch 96A and the second switch 96B (step S10). Thereafter, the during activation determination processing unit 128 determines whether or not the generated voltage of the first fuel cell system 16A and the generated voltage of the second fuel cell system 16B have reached the VCU operation permission voltage Va (step S11). In order to transition, from among the first power supply system 12A and the second power supply system 12B, sequentially in this order from the power supply system 12 in which the generated voltage has reached the VCU operation permission voltage Va to the charging control, the during activation determination processing unit 128 turns the switch unit 96 off (step S12). In the case that the generated voltage has reached the VCU operation permission voltage Va, the during activation determination processing unit 128 adjusts, by causing the battery VCU 94 to operate, the voltage using the battery VCU 94 and charges the battery 90 (step S13).

In the pattern (b), the during activation determination processing unit 128 executes the charging control of the first power supply system 12A and the second power supply system 12B in the manner described above. In this case, as shown in FIG. 9A, the unit fuel cell systems 14 start supplying the fuel gas and the oxygen containing gas, and the during activation determination processing unit 128 turns off the first switch 96A and the second switch 96B (step S20). Thereafter, the during activation determination processing unit 128 determines whether or not the generated voltage of the first fuel cell system 16A and the generated voltage of the second fuel cell system 16B have reached the VCU operation permission voltage Va (step S21). In the case that the generated voltage has reached the VCU operation permission voltage Va, the during activation determination processing unit 128 operates the battery VCU 94 and adjusts the voltage by the battery VCU 94 (step S22).

Figure 9B:
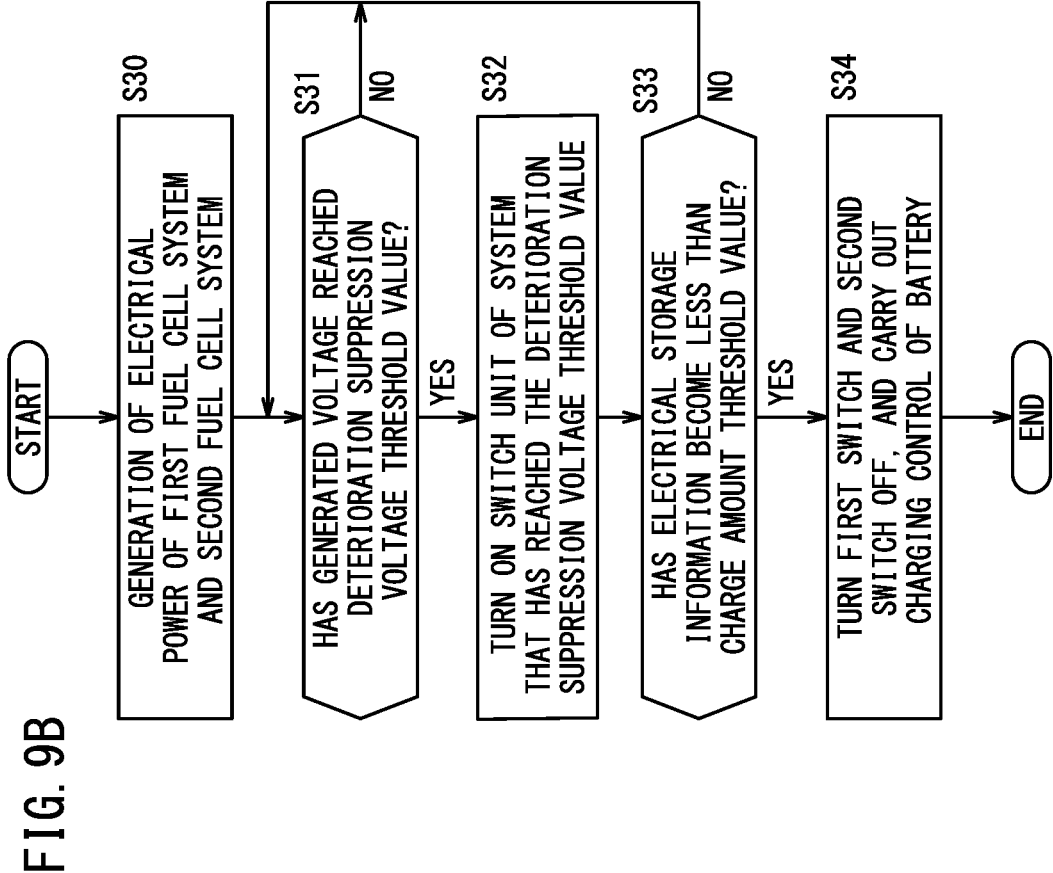
FIG. 9B is a flowchart showing a process flow during the (c) pattern control.
Figure 9A:
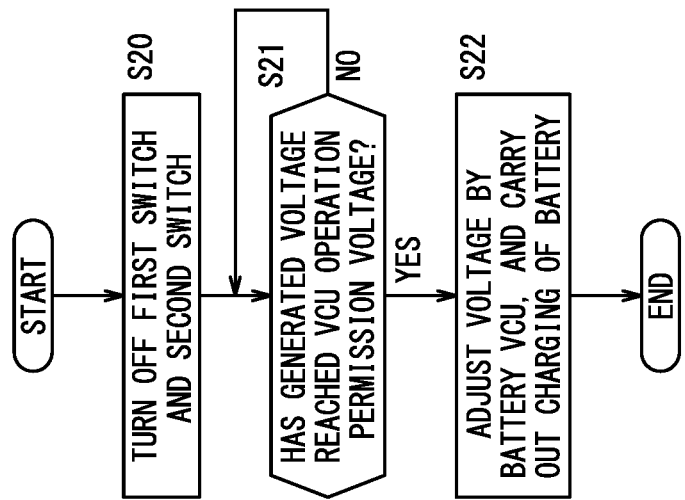
FIG. 9A is a flowchart showing a process flow during the (b) pattern control.

Further, in the pattern (c), as shown in FIG. 9B, the unit fuel cell systems 14 start supplying the fuel gas and the oxygen containing gas, and generation of electrical power of the first fuel cell system 16A and the second fuel cell system 16B is carried out (step S30). In addition, the during activation determination processing unit 128 determines whether or not the generated voltage of the first fuel cell system 16A or the generated voltage of the second fuel cell system 16B has reached the deterioration suppression voltage threshold value Thv (step S31). Concerning the power supply system 12 the generated voltage of which has reached the deterioration suppression voltage threshold value Thv, in order to execute the waste electricity control therein, the during activation determination processing unit 128 turns on the switch unit 96 (step S32). Furthermore, the during activation determination processing unit 128 monitors the electrical storage information of the battery 90, and determines whether or not the electrical storage information has become less than the charge amount threshold value Thq (step S33). In the case that the electrical storage information is greater than or equal to the charge amount threshold value Thq, the process returns to step S30, and the process is repeated in the same manner. On the other hand, in the case that the electrical storage information has become less than the charge amount threshold value Thq, the first switch 96A and the second switch 96B are turned off, together with the battery VCU 94 being operated to transition to the charging control (charging of the battery 90) (step S34).

Further, the during activation determination processing unit 128 monitors the electrical storage information and the temperature information, even during activation of the first power supply system 12A and the second power supply system 12B, and determines an intermediate switching of the patterns (a) to (c). For example, in the case that the temperature information becomes greater than or equal to the temperature threshold value Tht during a period in which the waste electricity control is being executed because the charge amount of the battery 90 is small and further the temperature information is less than the temperature threshold value Tht, transitioning may take place immediately from the waste electricity control to the charging control. Conversely, in the case that the temperature information becomes less than the temperature threshold value Tht during a period in which the waste electricity control is being executed because the charge amount of the battery 90 is small and further the temperature information is greater than or equal to the temperature threshold value Tht, transitioning may take place immediately from the charging control to the waste electricity control. Further, for example, in the case that the charge amount of the battery 90 has become in close proximity to being fully charged during a period in which the charging control is being executed due to the charge amount of the battery 90 being small, transitioning may take place immediately to the waste electricity control.

The present invention is not limited to the above-described embodiment, and various modifications can be made thereto in accordance with the essence and gist of the invention. For example, by implementing an appropriate modification, the electrical power control system 10 can be configured in a manner so as to control the electrical power of at least three of the power supply systems 12. Alternatively, a configuration can be provided in which the electrical power of one of the power supply systems 12 is controlled.

Figure 10:
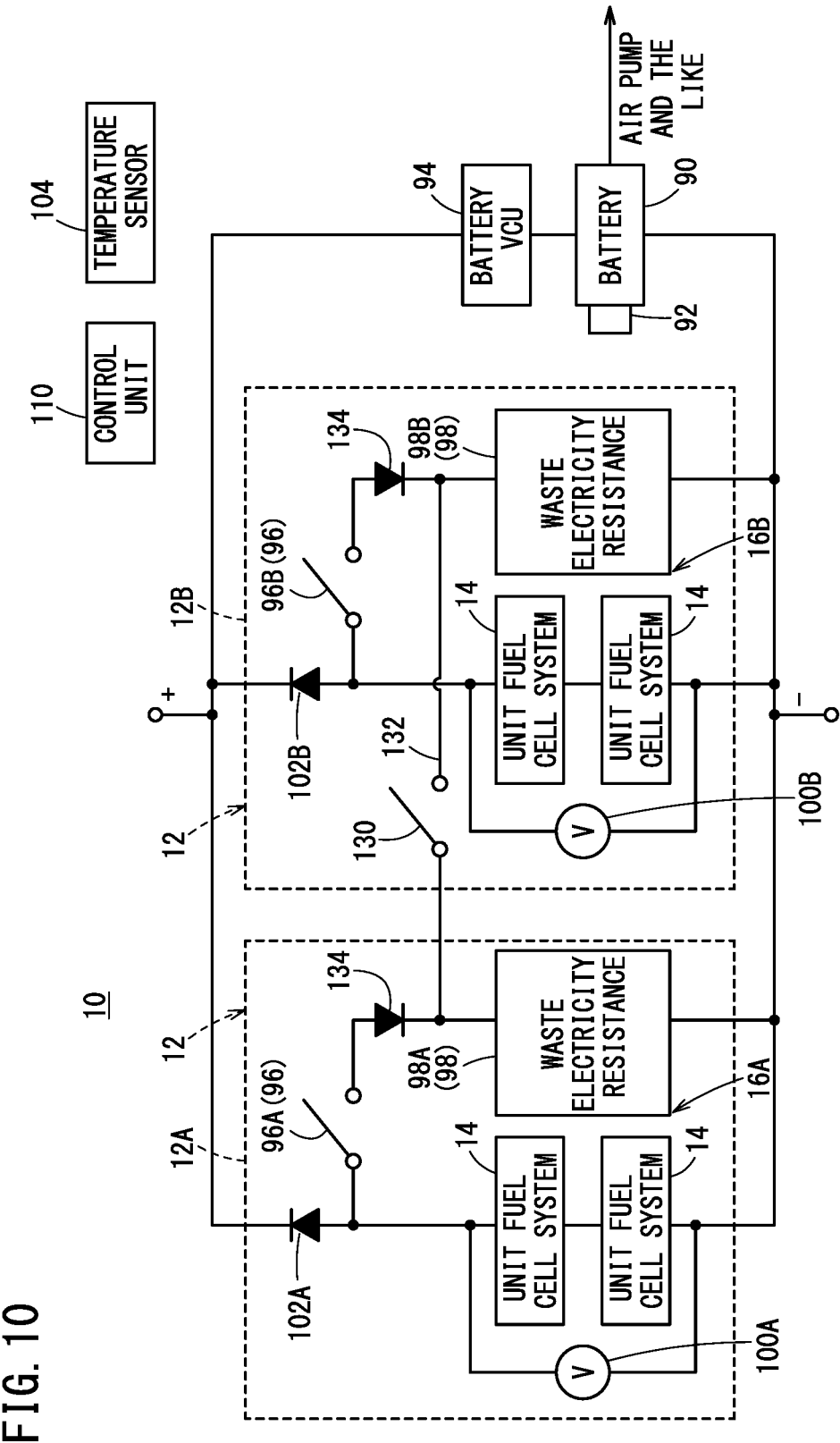
FIG. 10 is an explanatory diagram schematically showing an overall configuration of an electrical power control system according to a first modified example.

Further, as in a first modified example shown in FIG. 10, the electrical power control system 10 may connect the waste electricity unit 98 (the first waste electricity resistance 98A) of the first power supply system 12A and the waste electricity unit 98 (the second waste electricity resistance 98B) of the second power supply system 12B via the third switch 130. In this case, diodes 134 that regulate the direction of current are disposed between a wiring 132 in which the third switch 130 is provided and the first switch 96A, and between the wiring 132 and the second switch 96B. The control unit 110 of the electrical power control system 10 turns on the third switch 130 at a time when the waste electricity control is executed. Consequently, the electrical power control system 10 is capable of carrying out the waste electricity control using both the first waste electricity resistance 98A and the second waste electricity resistance 98B.

Figure 11:
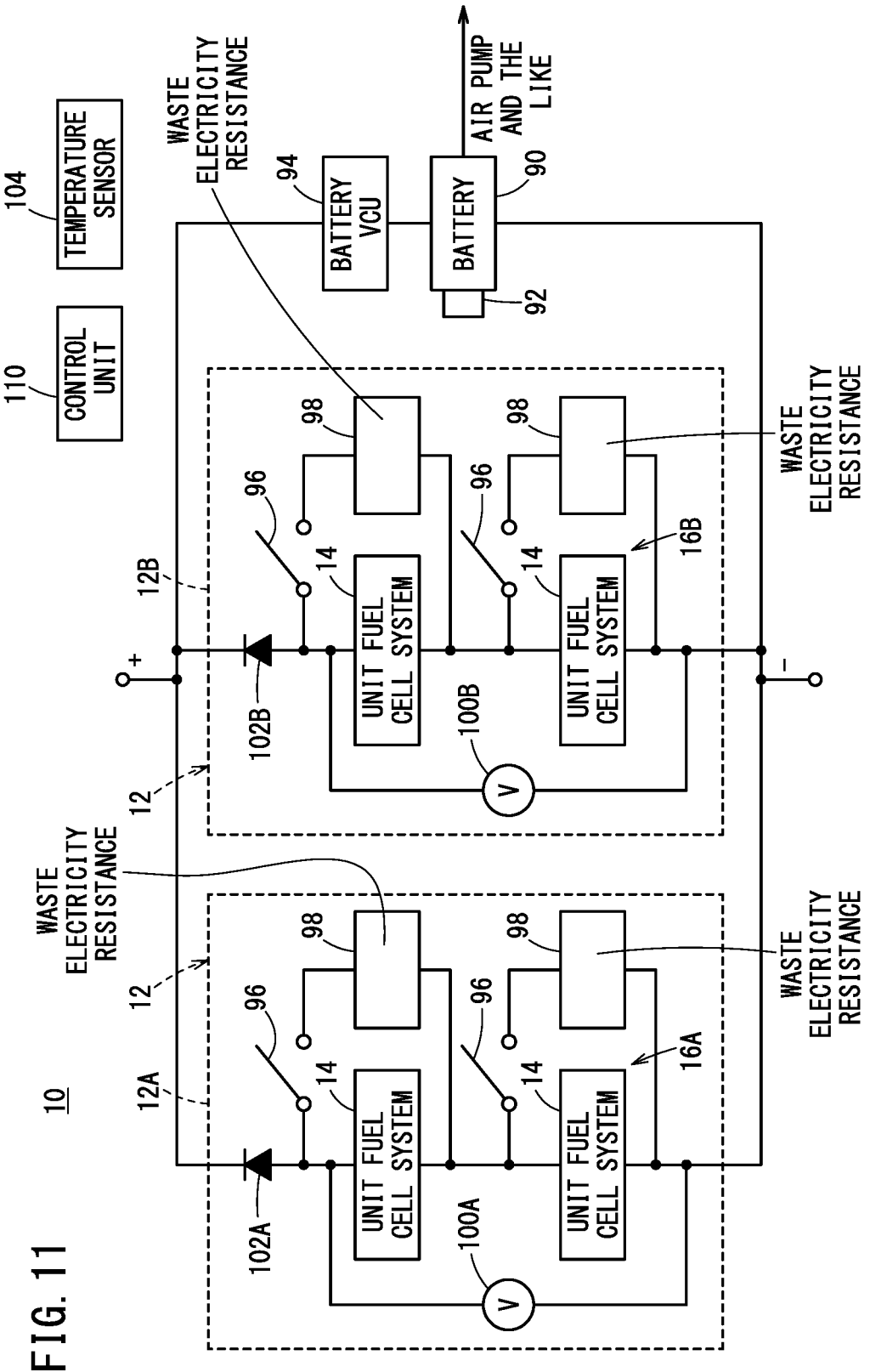
FIG. 11 is an explanatory diagram schematically showing an overall configuration of an electrical power control system according to a second modified example.

Further, as in a second modified example shown in FIG. 11, the electrical power control system 10 may connect the switch unit 96 and the waste electricity unit 98 for each of the unit fuel cell systems 14. In accordance with this modification, it is possible to carry out the waste electricity control for each of the unit fuel cell systems 14, and the output efficiency of the power supplies at the time of starting can be further enhanced.

Technical concepts and advantageous effects which can be grasped from the above-described embodiments will be explained below.

The electrical power control system 10 according to one aspect of the present invention comprises the fuel cell system (the unit fuel cell systems 14), the at least one power supply system 12 equipped with the waste electricity unit 98 connected in series with the switch unit 96, and further, connected in parallel with the fuel cell system together with the switch unit 96, the power storage device (the battery 90) connected in parallel with the at least one power supply system 12, the electrical storage information acquisition unit (the charge amount detection unit 92) that acquires the electrical storage information related to the charge amount of the power storage device, the temperature information acquisition unit (the temperature sensor 104) that acquires the temperature information related to an ambient temperature of the at least one power supply system 12, and the control unit 110 that controls the at least one power supply system 12, wherein, at a time when the at least one power supply system 12 is started, based on at least one of the temperature information and the electrical storage information, the control unit 110 selectively executes the charging control in which a rise in voltage is suppressed by supplying electrical power of the at least one power supply system 12 to the power storage device, and the waste electricity control in which a rise in voltage is suppressed by supplying the electrical power from the at least one power supply system 12 to the waste electricity unit 98.

In accordance with the above-described configuration, the electrical power control system 10, by means of a simple configuration made up from the waste electricity unit 98 and the switch unit 96, is capable of enhancing the output efficiency at the time of starting by controlling the voltage at the time when the at least one power supply system 12 is started. More specifically, the control unit 110, by performing controls (the charging control and the waste electricity control) in accordance with the charge amount of the power storage device (the battery 90) or the ambient temperature of the power supply systems 12, is capable of suppressing deterioration of the fuel cells due to a rise in voltage of the power supply systems 12, while reducing a loss of the generated electrical power of the fuel cell systems (the unit fuel cell systems 14).

Further, the control unit 110 determines whether or not the electrical storage information is greater than or equal to the predetermined charge amount, and executes the waste electricity control in the case that the electrical storage information is greater than or equal to the predetermined charge amount. In accordance with this feature, in the case that the charge amount of the power storage device (the battery 90) is large, the electrical power control system 10 is capable of transferring the generated electrical power of the fuel cell systems (the unit fuel cell systems 14) to the waste electricity unit 98, and it is possible to increase the starting efficiency at the time when the fuel cell system is started.

Further, the power storage device (the battery 90) carries out discharging at the time of the waste electricity control, and the control unit 110 monitors the electrical storage information at the time of the waste electricity control, and in the case that the electrical storage information has become less than the charging capable threshold value Thc, transitions from the waste electricity control to the charging control. Consequently, when transitioning from the waste electricity control to the charging control, the electrical power control system 10 can satisfactorily charge the power storage device with the generated electrical power of the fuel cell systems (the unit fuel cell systems 14).

Further, in the case that the electrical storage information is less than the predetermined charge amount, the control unit 110 determines whether or not the temperature information is greater than a predetermined temperature, in the case that the temperature information is greater than or equal to the predetermined temperature, executes the charging control without implementing the waste electricity control, and in the case that the temperature information is less than the predetermined temperature, executes the waste electricity control, and thereafter, executes the charging control. In accordance with the above-described configuration, the electrical power control system 10 can appropriately perform the charging control and the waste electricity control based on the ambient temperature of one or more of the power supply systems 12 when the charge amount of the power storage device is small.

There is further provided the voltage conversion unit (the battery VCU 94) connected in series with the power storage device (the battery 90), and in the control unit 110, in the charging control, the voltage at the time when the at least one power supply system 12 is started is set by the voltage conversion unit to be less than or equal to the predetermined deterioration suppression voltage threshold value Thy. In accordance with the above-described configuration, the electrical power control system 10 is capable of more reliably suppressing deterioration of the fuel cells.

Further, the at least one power supply system 12 includes the first power supply system 12A, and the second power supply system 12B, the first power supply system 12A includes the first fuel cell system 16A which is the fuel cell system (the at least one unit fuel cell system 14), the first switch 96A which is the switch unit 96, and the first waste electricity resistance 98A which is the waste electricity unit 98, the second power supply system 12B includes the second fuel cell system 16B which is the fuel cell system, the second switch 96B which is the switch unit 96, and the second waste electricity resistance 98B which is the waste electricity unit 98, and the power storage device (the battery 90) is capable of charging the electrical power of each of the first power supply system 12A and the second power supply system 12B. By carrying out the above-described determinations and controls, the electrical power control system 10 can significantly improve the output efficiency of the first power supply system 12A and the second power supply system 12B, even if the voltages rise at different timings at the time of starting.

During execution of the waste electricity control carried out when the temperature information is less than the predetermined temperature, the control unit 110 determines whether or not the temperature information is greater than or equal to the predetermined temperature, and in the case that the temperature information has become greater than or equal to the predetermined temperature, the waste electricity control is switched from the waste electricity control to the charging control, even prior to the output voltage of either one of the first fuel cell system 16A or the second fuel cell system 16B rising to a predetermined output value. In accordance with the above-described configuration, based on a change in the temperature, the electrical power control system 10 can smoothly transition from the waste electricity control to the charging control.

Further, in the waste electricity control, the control unit 110 turns on the first switch 96A based on a timing at which the voltage of the first fuel cell system 16A rises, and turns on the second switch 96B based on a timing at which the voltage of the second fuel cell system 16B rises. In accordance with this feature, the electrical power control system 10 can appropriately control the supply of electrical power from the first power supply system 12A to the first waste electricity resistance 98A, and the supply of electrical power from the second power supply system 12B to the second waste electricity resistance 98B, and it is possible to further suppress a loss of the generated electrical power.

Further, the first waste electricity resistance 98A and the second waste electricity resistance 98B are connected via the third switch 130, and the control unit 110 turns on the third switch 130 at the time when the waste electricity control is executed. In accordance with this feature, at the time when the waste electricity control of one of the first power supply system 12A and the second power supply system 12B is executed, the electrical power control system 10 is made capable of utilizing the waste electricity unit 98 of the other of the first power supply system 12A and the second power supply system 12B, and an effect due to raising the temperature of the waste electricity unit 98 or the like can be efficiently obtained.

What is claimed is:

1. An electrical power control system, comprising:
   at least one power supply system comprising:
      a waste electricity unit connected in series with a switch unit, and
      a fuel cell system connected in parallel with the waste electricity unit and the switch unit;
   a power storage device connected in parallel with the at least one power supply system;
   a first processing circuit configured to acquire electrical storage information related to a charge amount of the power storage device;
   a temperature sensor configured to acquire temperature information related to an ambient temperature of the at least one power supply system; and
   a second processing circuit configured to control the at least one power supply system;
   wherein, at a time when the at least one power supply system is started, based on at least one of the temperature information and the electrical storage information, the second processing circuit selectively executes a charging control in which a rise in voltage is suppressed by supplying electrical power of the at least one power supply system to the power storage device, and a waste electricity control in which a rise in voltage is suppressed by supplying the electrical power from the at least one power supply system to the waste electricity unit.

2. The electrical power control system according to claim 1, wherein the second processing circuit:
   determines whether or not the electrical storage information is greater than or equal to a predetermined charge amount; and
   executes the waste electricity control in the case that the electrical storage information is greater than or equal to the predetermined charge amount.

3. The electrical power control system according to claim 2, wherein:
   the power storage device carries out discharging at the time of the waste electricity control; and
   the second processing circuit monitors the electrical storage information at the time of the waste electricity control, and in the case that the electrical storage information has become less than a charging capable threshold value, transitions from the waste electricity control to the charging control.

4. The electrical power control system according to claim 2, wherein the second processing circuit:
- in the case that the electrical storage information is less than the predetermined charge amount, determines whether or not the temperature information is greater than a predetermined temperature;
- in the case that the temperature information is greater than or equal to the predetermined temperature, executes the charging control without implementing the waste electricity control; and
- in the case that the temperature information is less than the predetermined temperature, executes the waste electricity control, and thereafter, executes the charging control.

5. The electrical power control system according to claim 1, further comprising:
- a voltage conversion unit connected in series with the power storage device; and
- in the second processing circuit, in the charging control, the voltage at the time when the at least one power supply system is started is set by the voltage conversion unit to be less than or equal to a predetermined deterioration suppression voltage threshold value.

6. The electrical power control system according to claim 1, wherein:
- the at least one power supply system includes a first power supply system, and a second power supply system;
- the first power supply system includes a first fuel cell system which is the fuel cell system, a first switch which is the switch unit, and a first waste electricity resistance which is the waste electricity unit;
- the second power supply system includes a second fuel cell system which is the fuel cell system, a second switch which is the switch unit, and a second waste electricity resistance which is the waste electricity unit; and
- the power storage device is capable of charging the electrical power of each of the first power supply system and the second power supply system.

7. The electrical power control system according to claim 6, wherein the second processing circuit:
- determines whether or not the electrical storage information is greater than or equal to a predetermined charge amount;
- in the case that the electrical storage information is greater than or equal to the predetermined charge amount, executes the waste electricity control,
- in the case that the electrical storage information is less than the predetermined charge amount, determines whether or not the temperature information is greater than a predetermined temperature;
- in the case that the temperature information is greater than or equal to the predetermined temperature, executes the charging control without implementing the waste electricity control;
- in the case that the temperature information is less than the predetermined temperature, executes the waste electricity control, and thereafter, executes the charging control; and
- during execution of the waste electricity control carried out when the temperature information is less than the predetermined temperature, determines whether or not the temperature information is greater than or equal to the predetermined temperature, and in the case that the temperature information has become greater than or equal to the predetermined temperature, the waste electricity control is switched from the waste electricity control to the charging control, even prior to the output voltage of either one of the first fuel cell system or the second fuel cell system rising to a predetermined output value.

8. The electrical power control system according to claim 6, wherein, in the waste electricity control, the second processing circuit turns on the first switch based on a timing at which the voltage of the first fuel cell system rises, and turns on the second switch based on a timing at which the voltage of the second fuel cell system rises.

9. The electrical power control system according to claim 6, wherein:
- the first waste electricity resistance and the second waste electricity resistance are connected via a third switch; and
- the second processing circuit turns on the third switch at a time when the waste electricity control is executed.

* * * * *